(12) United States Patent
Nurmi et al.

(10) Patent No.: US 10,174,662 B2
(45) Date of Patent: Jan. 8, 2019

(54) ARRANGEMENT FOR TREATING EXHAUST GASES OF AN INTERNAL COMBUSTION PISTON ENGINE IN A MARINE VESSEL AND METHOD OF OPERATING AN ARRANGEMENT FOR TREATING EXHAUST GASES

(71) Applicant: Wärtsilä Finland Oy, Vaasa (FI)

(72) Inventors: Petteri Nurmi, Turku (FI); Sami Parkkinen, Turku (FI); Martti Raevaara, Turku (FI); Jyrki Ristimäki, Vaasa (FI); Valtteri Vainio, Turku (FI)

(73) Assignee: WÄRTSILÄ FINLAND OY, Vaasa (FI)

( * ) Notice: Subject to any disclaimer, the term of this patent is extended or adjusted under 35 U.S.C. 154(b) by 0 days.

(21) Appl. No.: 15/532,211

(22) PCT Filed: Dec. 8, 2014

(86) PCT No.: PCT/FI2014/050962
§ 371 (c)(1),
(2) Date: Jun. 1, 2017

(87) PCT Pub. No.: WO2016/092142
PCT Pub. Date: Jun. 16, 2016

(65) Prior Publication Data
US 2017/0335742 A1  Nov. 23, 2017

(51) Int. Cl.
*F01N 3/04* (2006.01)
*F01N 13/00* (2010.01)
(Continued)

(52) U.S. Cl.
CPC ........... *F01N 13/004* (2013.01); *B01D 53/18* (2013.01); *B63H 21/32* (2013.01); *F01N 3/04* (2013.01);
(Continued)

(58) Field of Classification Search
CPC .... B01D 47/06; B01D 47/063; B01D 47/066; B01D 47/12; B01D 2252/103;
(Continued)

(56) References Cited

U.S. PATENT DOCUMENTS

| 5,367,889 A | 11/1994 | Lanyon |
| 2010/0206665 A1 | 8/2010 | McGregor |
| 2013/0319236 A1* | 12/2013 | Suominen ................ F01N 3/04 95/205 |

FOREIGN PATENT DOCUMENTS

| GB | 2332631 A | 6/1999 |
| WO | 2007045721 A1 | 4/2007 |
| WO | 2012113977 A1 | 8/2012 |

OTHER PUBLICATIONS

Patent Cooperation Treaty, International Search Report for PCT/FI2014/050962 dated Aug. 12, 2015, 4 pages.
(Continued)

*Primary Examiner* — Jonathan Matthias
(74) *Attorney, Agent, or Firm* — Heslin Rothenberg Farley & Mesiti P.C.; Victor A. Cardona, Esq.

(57) ABSTRACT

An arrangement for treating exhaust gases of an internal combustion piston engine in a marine vessel, includes an exhaust gas channel coupled at its first end to the engine and having its second end opening to the environment, and a scrubber unit arranged between the first end and the second end of the exhaust gas channel. The arrangement has an exhaust gas channel cleaning system arranged to apply cleaning liquid on inner surface of the exhaust gas channel to a portion of the exhaust gas channel between the scrubber unit and the second end of the exhaust gas channel.

15 Claims, 1 Drawing Sheet

(51) Int. Cl.
*B01D 53/18* (2006.01)
*B63H 21/32* (2006.01)
*F01N 1/00* (2006.01)
*F01N 3/00* (2006.01)

(52) U.S. Cl.
CPC ............... *B01D 2252/103* (2013.01); *B01D 2252/1035* (2013.01); *F01N 1/00* (2013.01); *F01N 3/005* (2013.01); *F01N 2590/02* (2013.01); *Y02T 10/20* (2013.01)

(58) Field of Classification Search
CPC ............. B01D 2252/1035; F01N 3/029; F01N 3/0293; F01N 3/04; F01N 13/004; F01N 2590/02
See application file for complete search history.

(56) References Cited

OTHER PUBLICATIONS

Patent Cooperation Treaty, Written Opinion of the International Preliminary Examining Authority for PCT/FI2014/050962 dated Nov. 22, 2016, 5 pages.
Patent Cooperation Treaty, Notification of Transmittal of the International Preliminary Report on Patentability for PCT/FI2014/040962 dated Feb. 28, 2017, 31 pages.

* cited by examiner

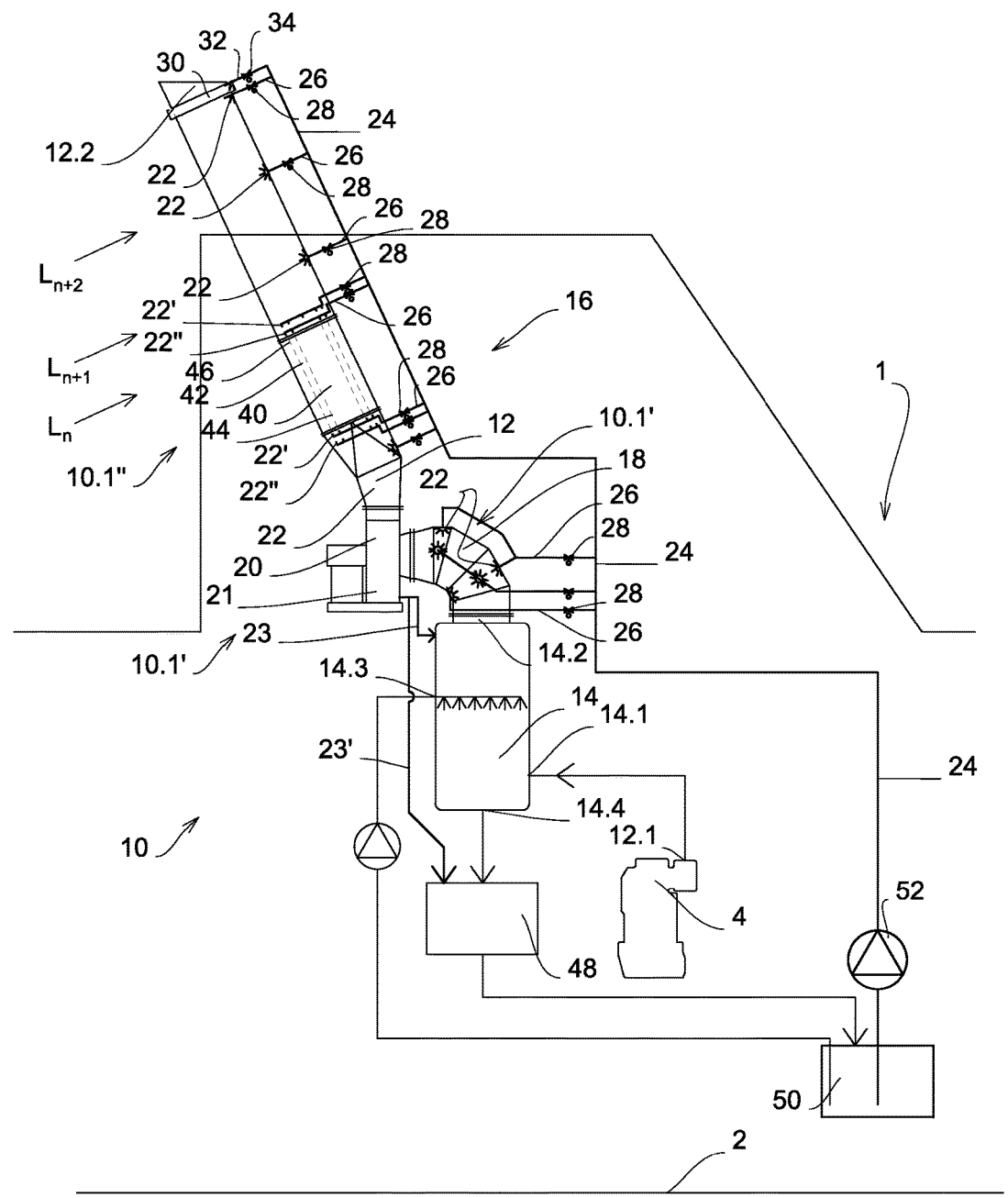

ARRANGEMENT FOR TREATING EXHAUST GASES OF AN INTERNAL COMBUSTION PISTON ENGINE IN A MARINE VESSEL AND METHOD OF OPERATING AN ARRANGEMENT FOR TREATING EXHAUST GASES

CROSS REFERENCE TO RELATED APPLICATIONS

This application is a National Stage filing under section 371 of International Application No. PCT/FI2014/050962, filed on Dec. 8, 2014, and published on Jun. 16, 2016, as WO 2016/092142 A1. The entire disclosure of the prior application is hereby incorporated herein by reference.

TECHNICAL FIELD

The present invention relates to an arrangement for treating exhaust gases of an internal combustion piston engine in a marine vessel, comprising an exhaust gas channel coupled at its first end to the engine and having its second end opening to the environment, and a scrubber unit arranged between the first end and the second end of the exhaust gas channel, according to the preamble of claim 1.

Invention relates also to method of operating an arrangement for treating exhaust gases of an internal combustion piston engine in a marine vessel according to the preamble of the independent method claim.

BACKGROUND ART

Environmental awareness in cruise ship business and among passengers lead to increased need to minimize the emissions to the environment. Scrubber units for scrubbing exhaust gas from internal combustion piston engines have been used on marine vessels to some extent for reducing the exhaust gas emission to the atmosphere. Exhaust gas is led into the scrubber unit in which a scrubbing medium, such as an alkaline washing solution, is sprayed into the exhaust gas, whereby the alkaline components react with acidic components of the exhaust gas. The scrubbing medium is sometimes supplied from a so-called process tank. The scrubbing medium absorbs $SO_2$, heat and other components from the exhaust gas flow. Before the scrubbed exhaust gas is discharged to the atmosphere, it may be led through a droplet separator arranged before the stack of the vessel. Due to e.g. stricter environmental regulations so called two-stage or multi-stage scrubber units have been developed. In such scrubber units, scrubbing medium is sprayed into the exhaust gas flow at two or several stages.

As examples of such scrubber units it is referred to publications WO 2007/045721 A1 and WO 2012/113977 A1. WO 2007/045721 A1 discloses a method of and an arrangement for treating the exhaust gases of a large supercharged internal combustion engine, especially a diesel engine, in a system, in which the exhaust gases from the engine are conducted to an exhaust gas scrubber to be washed and cooled at least mainly by water.

WO 2012/113977 A1 discloses a method of treating exhaust gas in a two-stage scrubber system of a marine vessel with a water based solution, in which the exhaust gas is treated in the first scrubber unit by means of sea water based scrubbing medium and that the exhaust gas is treated in the second scrubber unit by means of fresh water based scrubbing medium.

Document US2010206665 A1 discloses a muffler for engines in oil-field applications. Document discloses spraying nozzles for spraying water mist and flushing ports for delivering water into the muffler.

Document GB 2332631 A discloses an apparatus for removing carbon particulate from the exhaust gas stream of an internal combustion engine where oil is injected into the exhaust gas which is then vaporized and further cooled down such that condensation occurs to droplets of oil within which the particulates are suspended.

For practical reasons the scrubber unit is very difficult, if not impossible, to be positioned as the latest component in the exhaust gas system in a marine vessel, the exhaust gas system has an end duct portion leading downstream from the scrubber unit to the funnel of the vessel. Now, it has been discovered that operation is a circumstances is not of satisfactory and therefore it is an object of the invention to provide a scrubber unit in which the performance is considerably improved compared to the prior art solutions.

DISCLOSURE OF THE INVENTION

Object of the invention is substantially met by an arrangement for treating exhaust gases of an internal combustion piston engine in a marine vessel comprising an exhaust gas channel coupled at its first end to the engine and having its second end opening to the environment, and a scrubber unit comprising an exhaust gas inlet and an exhaust gas outlet and being arranged between the first end and the second end of the exhaust gas channel. It is characteristic to the invention that the exhaust gas channel starting from the exhaust gas outlet of the scrubber unit (14) comprises an exhaust gas channel cleaning system arranged to apply cleaning liquid on inner surface of the exhaust gas channel to a portion of the exhaust gas channel between the scrubber unit and the second end of the exhaust gas channel.

According to an embodiment of the invention the cleaning system comprises a number of spray heads for spraying cleaning liquid and the spray heads are distributed to the portion of the exhaust gas channel between the scrubber unit and the second end of the exhaust gas channel.

According to an embodiment of the invention the spray heads are aligned with each other to the perimeter of the exhaust gas channel.

According to an embodiment of the invention the arrangement comprises a blower arranged between the scrubber unit and the second end of the exhaust gas channel, and that the blower housing is provided with a drain pipe for removing the cleaning liquid from the housing. The drain pipe may lead to the scrubber unit or directly to a liquid collecting system of the scrubber. This way the cleaning system and the scrubber unit are integrated at their liquid collecting parts sharing a common liquid collecting system.

According to an embodiment of the invention the arrangement comprises a blower arranged between the scrubber unit and the second end of the exhaust gas channel, and that the spray heads are distributed one spray head at one longitudinal location along the length of the portion of the exhaust gas channel between the blower and the second end of the exhaust gas channel.

According to an embodiment of the invention the cleaning system comprises spray heads arranged to the exhaust gas channel comprise a nozzle provided with 360° fluid delivering coverage. In other words the spray pattern is hemispherical.

According to an embodiment of the invention the arrangement comprises a blower arranged between the scrubber unit and the second end of the exhaust gas channel, and that a number of spray heads are distributed along the circumference of the exhaust gas channel at the portion of the exhaust gas channel between the scrubber unit and the blower.

According to an embodiment of the invention the arrangement comprises a silencer unit arranged between the scrubber unit and the second end of the exhaust gas channel and the exhaust gas channel cleaning system comprises number of spray heads arranged on the inlet side and the outlet side of the silencer unit directed to spray the cleaning liquid towards the surfaces of the silencer unit.

According to an embodiment of the invention cleaning system and the scrubber unit are provided with a common liquid collecting system for handling the used cleaning and scrubbing liquid.

Object of the invention is also met by method of operating an arrangement for treating exhaust gases of an internal treating exhaust gases of an internal combustion piston engine in a marine vessel, in which method during a first mode of operation, while the engine is running, exhaust gases from the engine are lead via an exhaust gas channel to a scrubber unit where a gas scrubbing stage is practised and after that the gases are led via the exhaust gas channel to the environment through a second end of the exhaust gas channel, and characterized in that during a second mode of operation, while the engine is stopped, cleaning liquid is applied on inner surface of the exhaust gas channel starting from an exhaust gas outlet of the scrubber unit, to a portion of the exhaust gas channel between the scrubber unit and the second end of the exhaust gas channel.

According to an embodiment of the invention during the first operational mode an exhaust gas blower arranged between the scrubber unit and the second end of the exhaust gas channel is operated and during the second mode of operation the exhaust gas blower is stopped.

Scrubbing liquid used for gas scrubbing of the gas and the cleaning liquid are collected in a common liquid collecting system in one at a time.

In a marine installation the scrubbing medium can be fresh water or sea water i.e. the water in which the vessel is floating. In case fresh water is used, it is typically recirculated, so that the same water can be re-used, and a small portion of the re-circulated fresh water, called bleed-off, is diverted from the main stream, conducted to a treatment plant for cleaning, and discharged overboard. Used water is compensated by a certain amount of new topping-up fresh water. In case of sea water, all used water is typically conducted to a treatment plant, and discharged overboard, typically without any re-circulation taking place.

The fresh water system can operate independently of the sea water quality, but needs some fresh water and some chemical. The sea water system needs no fresh water and no chemicals, but performance depends on the sea water quality.

It is possible to use the same scrubbing system in two different operating modes by changing the scrubbing medium in the complete system. In other words, sometimes the scrubbing system is operated with fresh water, sometimes with sea water, depending on prevailing conditions.

BRIEF DESCRIPTION OF DRAWINGS

In the following, the invention will be described with reference to the accompanying exemplary, schematic drawing, in which FIG. 1 illustrates an arrangement for treating exhaust gases of an internal combustion piston engine in a marine vessel according to an embodiment of the invention.

DETAILED DESCRIPTION OF DRAWINGS

FIG. 1 depicts schematically a marine vessel 1 provided with a hull 2, an internal combustion piston engine 4. The marine vessel is provided with an arrangement 10 for treating exhaust gases of the engine 4. The vessel is also provided with a propulsion system (not shown) which may be operated by the engine directly or indirectly by means of electric power generated by the engine. The arrangement for treating exhaust gases 10 comprises an exhaust gas channel 12 coupled with the engine 4. The exhaust gas channel has a first end 12.1 and a second end 12.2. The first end 12.1 of the exhaust gas channel is connected to the engine 4 and the channel is extending, mainly inside the vessel, such that its second end 12.2 opens into the environment. The arrangement is provided with a scrubber unit 14 provided in the exhaust gas channel 12, between the first end 12.1 and the second end 12.2. The scrubber unit 14 is arranged for decreasing the amount of impurities from the exhaust gas arranged flow through the scrubber unit 14. The scrubber unit 14 has an inlet 14.1 for feeding the exhaust gas therein and an outlet 14.2 for removing the exhaust gas therefrom. The scrubber unit has also an inlet 14.3 for scrubbing liquid and an outlet 14.4 for scrubbing liquid. The scrubber unit 14 may be of type known as such and therefore it is not, nor its operation, described herein in a detailed manner. The scrubber unit 14 is provided with means for spraying scrubbing liquid to be in contact with the exhaust gas flowing through the scrubber unit and thus cleaning the gas.

The arrangement further comprises an exhaust gas channel cleaning system 16 in connection with the exhaust gas channel 10. The exhaust gas channel cleaning system 16 is arranged to apply cleaning liquid on inner surface of the exhaust gas channel 10, particularly to its portion between the scrubber unit 14 and the second end 12.2 of the exhaust gas channel 12. For sake of clarity the portion of the exhaust channel 10 between the scrubber unit 14 and the second end 12.2 of the exhaust gas channel 12, is referred to as an outlet part 10.1. In other words, the outlet part 10.1 starts from the outlet 14.2 of the scrubber unit and ends at the factual outlet of the exhaust gas channel 10.

The cleaning liquid is preferably water based solution. According to an advantageous embodiment the cleaning liquid is sea water or processed fresh water available in the vessel.

In the embodiment shown in FIG. 1 the outlet part 10.1 comprises a blower 20 arranged downstream from the scrubber unit 14 in the gas flow direction in practical circumstances. There is a first section 10.1' of the outlet part 10.1 arranged between the scrubber unit 14 and the blower 20. The outlet part 10.1 has a second section 10.1" downstream the blower 20 leading to the second end 12.2 of the exhaust gas channel 12. The first section 10.1' of the outlet part is provided with a number of spray heads 22. The spray heads are distributed along the circumference of the exhaust gas channel at the section of the exhaust gas channel between the scrubber unit and the blower.

The cleaning system comprises a number of spray heads 22 assembled to the wall of the exhaust gas channel 12 arranged to spray the cleaning liquid into the channel 12. The spray heads are distributed length-wise over the outlet part 10.1 of the exhaust gas channel 12. The arrangement is further provided with a cleaning liquid distribution pipe 24. The spray heads 22 are arranged to corresponding locations i.e. the spray heads 22 are aligned with each other to the perimeter of the channel 12 such that the heads 22 are connectable at same side of the channel 12 to a distribution pipe 24. The distribution pipe 24 is arranged to follow the outlet part 10.1 of the exhaust gas channel 12 from the blower to the second end of the 12.2 of the exhaust gas channel 12 such that it runs directly, via a shortest distance, from one spray head 22 to another.

Each of the spray heads 22 is connected via a branch pipe 26 the distribution pipe 24. The branch pipe 26 is provided with a valve 28 for opening or closing the flow connection between the distribution pipe 24 and the spray head 22. The spray heads are distributed such that there is one spray head at one longitudinal location $L_n$, $L_{n+1}$, ... along the length of the outlet part 10.1 of the exhaust gas channel. The majority of the spray heads 22, that is all of them except the one at the outlet edge of the exhaust channel, are arranged to provide a hemispherical spray pattern. The spray head 22 at the outlet edge of the exhaust channel is provided with a half of hemisphere spray pattern directing the spray inside the channel. This way it is possible to subject substantially the whole inside surface of the channel under the cleaning treatment.

The second end 12.2 of the exhaust gas channel 12 is provided with a collector trough 30 surrounding the outer surface of the exhaust gas channel 12 for collecting possible condensed water and preventing it from running down the outer surface of the channel. The collector trough 30 is provided with a passage to guide the collected water inside the exhaust gas channel 12. The cleaning system 13 is provided a spray head 22 arranged in the collecting trough 30. The spray head is connected with a branch pipe 32 provided with a valve 34 for opening or closing the flow connection between the distribution pipe 24 and the spray head 22.

The outlet part 10.1 of the channel is provided with a silencer unit 40 arranged after the blower 20 in the flow direction of the gas when the engine and/or the blower is running. The cleaning system 13 is provided a number of a spray heads 22', 22" arranged at both ends of the silencer unit 40. The spray heads 22', 22" are connected with a branch pipe 26 provided with a valve 28 for opening or closing the flow connection between the distribution pipe 24 and the spray head 22. The silencer unit is provided with a sleeve-like silencing element 42 which has an inner surface 44 and an outer surface 46. The spray heads 22', 22" are arranged to direct a jet of cleaning liquid towards the surfaces 44, 46 of the silencing element and the inner surface of the channel 12.

The blower is advantageously a centrifugal blower. The housing 21 of the centrifugal blower serves as a collector of the cleaning liquid and the housing is connected via a channel, such as a drain pipe 23 to the scrubber unit 14 in order to lead the used cleaning liquid to the scrubber unit 14 and there through further to a liquid collecting system 48. The drain pipe 23 can be lead to the upper part of the scrubber 14, as presented in FIG. 1. According to another embodiment of the invention the drain pipe 23 can also be lead to the lower part, or the bottom of the scrubber 14.

According to another embodiment of the invention the housing 21 of the centrifugal blower 20 serves as a collector of the cleaning liquid which makes it possible to lead the used cleaning liquid directly to liquid collecting system 48 via a drain pipe 23' without flowing through the scrubber unit.

Each of the spray heads has a common source of cleaning liquid 50 which according to an embodiment of the invention is a common source of scrubbing liquid of the scrubber unit 14.

The cleaning system 16 according to the invention and the scrubber unit 14 are provided with a common liquid collecting system.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such combination is technically feasible.

The invention claimed is:

1. An arrangement for treating exhaust gases of an internal combustion piston engine in a marine vessel comprising:
   an exhaust gas channel coupled at a first end-thereof to the engine and having a second end thereof opening to the environment; and
   a scrubber unit arranged between the first end and the second end of the exhaust gas channel, the scrubber unit comprising an exhaust gas inlet and an exhaust gas outlet, and an inlet for scrubbing liquid and an outlet for scrubbing liquid, and
   wherein an outlet part of the exhaust gas channel between the scrubber unit and the second end of the exhaust gas channel starting from the exhaust gas outlet of the scrubber unit comprises an exhaust gas channel cleaning system arranged to apply cleaning liquid on inner surface of the exhaust gas channel to a portion of the exhaust gas channel between the scrubber unit and the second end of the exhaust gas channel.

2. An arrangement according to claim 1, wherein the cleaning system comprises a number of spray heads for spraying cleaning liquid and the spray heads are distributed to the portion of the exhaust gas channel between the scrubber unit and the second end-of the exhaust gas channel.

3. An arrangement according to claim 1, wherein the cleaning system and the scrubber unit share a common liquid collecting system.

4. An arrangement according to claim 1, wherein the cleaning system comprises a plurality of spray heads for spraying cleaning liquid and the spray heads have a common source of cleaning liquid and the source is a source of scrubbing liquid of the scrubber unit.

5. An arrangement according to claim 1, wherein the cleaning system comprises a plurality spray heads for spraying cleaning liquid and the spray heads-are aligned with each other to the perimeter of the channel the exhaust gas channel.

6. An arrangement according to claim 1, wherein the arrangement comprises a blower arranged to the exhaust gas channel between the scrubber unit and the second end of the exhaust gas channel, and a blower housing is provided with a drain pipe for removing the cleaning liquid from the housing.

7. An arrangement according to claim 6, wherein the drain pipe for removing the cleaning liquid from the housing is connected to the upper part of the scrubber.

8. An arrangement according to claim 6, wherein the drain pipe for removing the cleaning liquid from the housing is connected to a liquid collecting system.

9. An arrangement according to claim 1, wherein the arrangement comprises a blower arranged to the exhaust gas channel between the scrubber unit and the second end of the exhaust gas channel, and the cleaning system comprises a plurality of spray heads arranged to the exhaust gas channel for spraying cleaning liquid and the spray heads are distributed one spray head at one longitudinal location along the length of the portion of the exhaust gas channel between the blower and the second end of the exhaust gas channel.

10. An arrangement according to claim 1, wherein the arrangement comprises a blower arranged to the exhaust as channel between the scrubber unit and the second end of the exhaust gas channel, and a plurality of spray heads are distributed along the circumference of the exhaust gas channel at the section of the exhaust gas channel between the scrubber unit and the blower.

11. An arrangement according to claim 1, wherein the arrangement comprises a silencer unit arranged to the exhaust gas channel between the scrubber unit and the second end of the exhaust gas channel and the exhaust gas channel cleaning system comprises a plurality of spray heads arranged to the exhaust gas channel on the inlet side and the outlet side of the silencer unit directed to spray the cleaning liquid towards the surfaces of the silencer unit.

12. A method for operating an arrangement for treating exhaust gases of an internal combustion piston engine according to claim 1 in a marine vessel, the method comprising:
 during a first mode of operation, while the engine is running, exhaust gases from the engine are led via an exhaust gas channel to a scrubber unit comprising an exhaust gas inlet and an exhaust gas outlet and an inlet for scrubbing liquid and an outlet for scrubbing liquid where scrubbing of the gas is practiced; and
 after that the gases are led via the exhaust gas channel to the environment through a second end of the exhaust gas channel, and
 wherein during a second mode of operation, while the engine is stopped, cleaning liquid is applied on inner surface of an outlet portion of the exhaust gas channel starting from an exhaust gas outlet of the scrubber unit.

13. A method for operating an arrangement for treating exhaust gases of an internal combustion piston engine in a marine vessel, the method comprising:
 during a first mode of operation, while the engine is running, exhaust gases from the engine are led via an exhaust gas channel to a scrubber unit comprising an exhaust gas inlet and an exhaust gas outlet and an inlet scrubbing liquid and an outlet for scrubbing liquid where scrubbing of the gas is practiced; and
 after that the gases are led via the exhaust gas channel to the environment through a second end of the exhaust gas channel, and
 wherein during a second mode of operation, while the engine is stopped, cleaning liquid is applied on inner surface of an outlet portion of the exhaust gas channel starting from an exhaust gas outlet of the scrubber unit.

14. The method for operating according to claim 13, wherein during the first operational mode an exhaust gas blower arranged between the scrubber unit and the second end of the exhaust gas channel is operated and during the second mode of operation the exhaust gas blower is stopped.

15. The method for operating according to claim 13, wherein scrubbing liquid used for gas scrubbing of the gas and the cleaning liquid are collected in a common liquid collecting system in one at a time.

* * * * *